July 8, 1930.   D. B. HENDRYX   1,769,994
RECUPERATOR
Original Filed Jan. 26, 1928   3 Sheets-Sheet 1
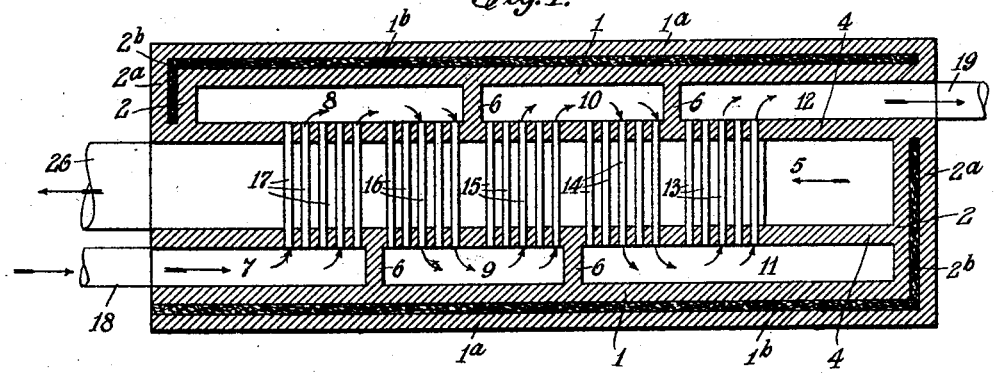
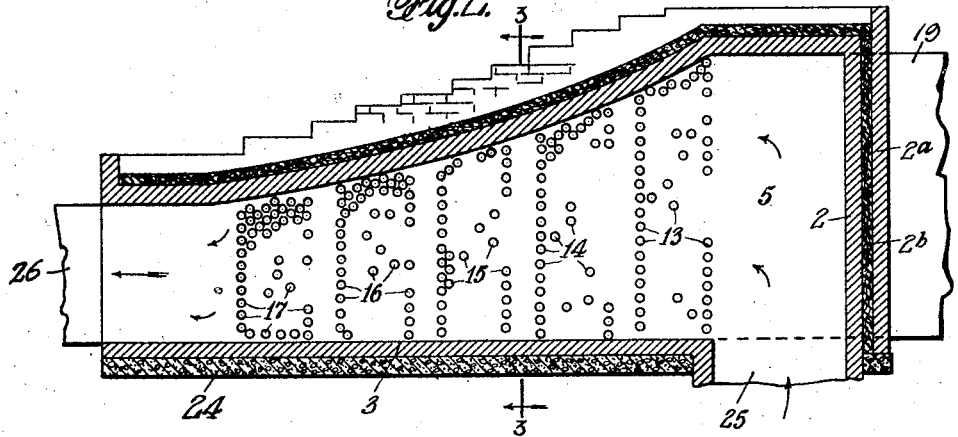

July 8, 1930.   D. B. HENDRYX   1,769,994
RECUPERATOR
Original Filed Jan. 26, 1928   3 Sheets-Sheet 2
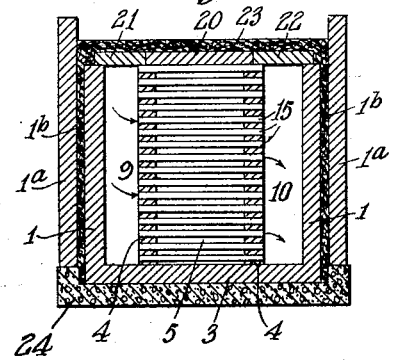
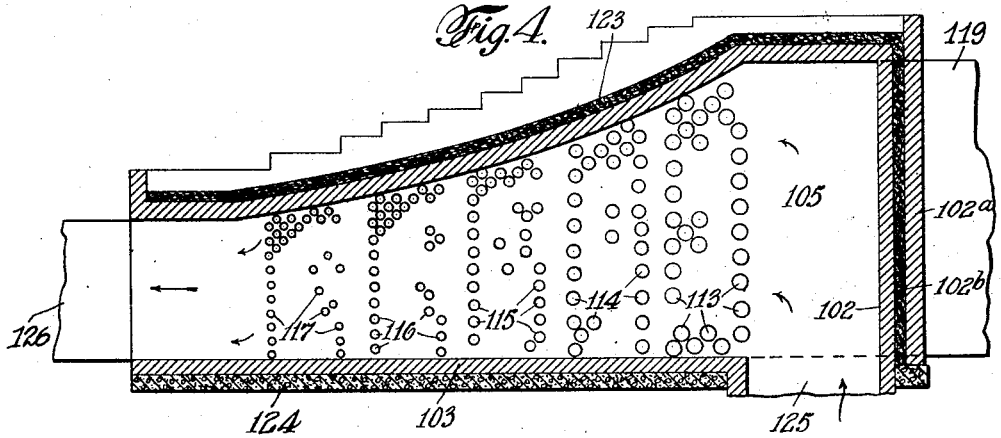

July 8, 1930.  D. B. HENDRYX  1,769,994
RECUPERATOR
Original Filed Jan. 26, 1928  3 Sheets-Sheet 3

INVENTOR
Dwight B. Hendryx
BY
ATTORNEY

Patented July 8, 1930

1,769,994

UNITED STATES PATENT OFFICE

DWIGHT B. HENDRYX, OF BRADFORD, PENNSYLVANIA, ASSIGNOR TO HANLEY COMPANY, OF BRADFORD, PENNSYLVANIA, A CORPORATION OF PENNSYLVANIA

RECUPERATOR

Application filed January 26, 1928, Serial No. 249,561. Renewed May 27, 1930.

My invention consists in the novel features hereinafter described, reference being had to the accompanying drawings which show one embodiment of the invention selected by me for purposes of illustration, and the said invention is fully disclosed in the following description and claims.

My invention consists in a novel recuperator for reclaiming the heat in one fluid by transferring it to another fluid during the passage of the respective fluids through the recuperator, and designed primarily for the purpose of reclaiming the heat in waste or exhaust gases from a heating process or from a heating furnace, or furnaces, for example, the exhaust gases from the firing zone or other portion of a tunnel kiln and using the reclaimed heat for the purpose of heating air kept out of contact, or admixture with the exhaust gases, it being understood that the recuperator may be employed for any other purposes for which it may be or is found to be advantageous. According to my invention the separate passages are provided for conducting the heating fluid, and the fluid to be heated through the recuperator out of contact with each other, said passages being of any desired form, or arrangement, and having heat transferring portions separating said passages, and exposed on opposite sides to the heating fluid and the fluid to be heated. The passages for heating fluid, which necessarily becomes cooled as it passes through the recuperator, and therefore reduced in volume, diminish in cross-sectional area, or capacity, in substantial proportion to the reduction of volume of the heating fluid, thereby maintaining a substantially uniform velocity of the heating fluid through the recuperator. The passages for the fluid to be heated, the volume of which increases during its passage through the recuperator, are increased in cross-sectional area, or capacity, in substantial proportion to the increase of volume due to the expansion of the heated fluid. This construction results in a high rate of heat transfer and the prevention of the formation of a stagnant film of heating fluid on the surfaces of the passages for the heating fluid and fluid to be heated, and results in exceptionally high efficiency in the operation of the recuperator. The heat conducting portions of the passages may be formed of metal or other suitable material, as silicon carbide, for example, and I find it convenient to employ tubular passages of metal or silicon carbide, or other suitable material, as portions of the passages for one fluid, and located within passages for the other, in which case the variation of the capacity of the passages of which said tubes form a part can be conveniently accomplished by varying the number of tubes or the diameter of the tubes, or both, as desired.

My invention also comprehends certain details of construction and combination of parts hereinafter described and fully pointed out in the claims, whereby freedom of leakage between the passages for the heating fluid and the heated fluid is secured, together with an extremely inexpensive and economical construction reducing the initial cost, together with a low power consumption in moving the fluids through the recuperator.

In the accompanying drawings,

Fig. 1 represents a horizontal sectional view of a recuperator embodying my invention.

Fig. 2 represents a central vertical sectional view of the same.

Fig. 3 represents a transverse vertical sectional view on the line 3—3 of Fig. 2.

Fig. 4 is a view similar to Fig. 2, illustrating a slight modification.

Figure 5:
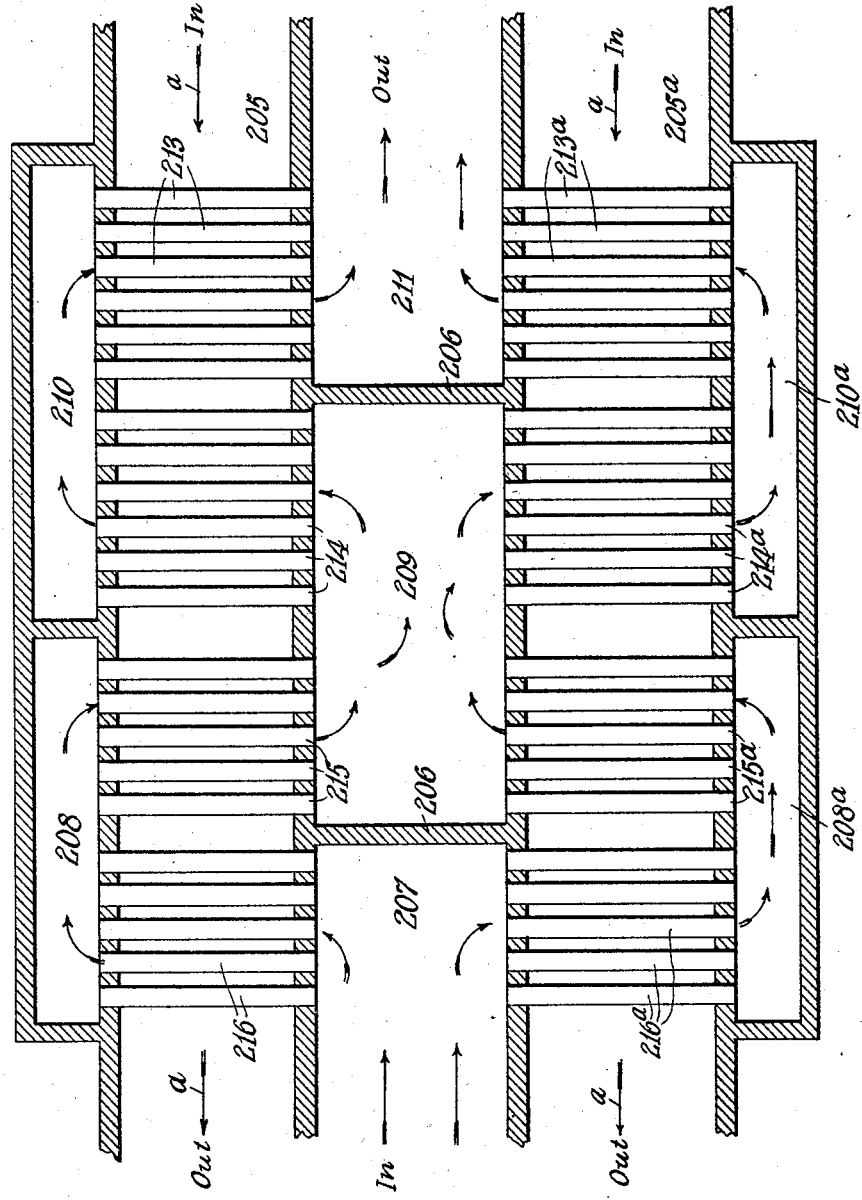
Fig. 5 is a horizontal sectional view of a recuperator embodying a slight modification of my invention.

In the form of my invention illustrated in Figs. 1, 2 and 3, 1, 1, represents the side walls, and 2, 2, represents the end walls, and 3 represents the floor of my improved recuperator, the side and end walls being preferably enclosed by an outer wall of ordinary brick, indicated at 1ª, 2ª, with a space between for heat insulating material, indicated at 1ᵇ and 2ᵇ. Within the side walls, 1, 1, are located header walls, 4, 4, preferably formed of fire brick, and in this instance extending parallel and longitudinally of the recuperator, forming a central passage indicated at 5, for one of the fluids, as the heating fluid, in this instance waste gases from a furnace, or furnaces, said passage being of uniform width, but gradually decreasing in height from the entrance end of the passage, 5, (at right in Figs. 1 and 2), to the exit or discharge end, (at the left in said figures.) Between each header wall and the adjacent side wall of the recuperator is a space which is divided by transverse vertically disposed partitions, 6, into a plurality of headers, indicated at 7, 8, 9, 10, 11 and 12, the transverse partition, 6, on one side of the recuperator being staggered with respect to those on the other side of the chamber 5. Across the passage, 5, for the heating fluid, are placed banks of tubes of heat conducting material, indicated at 13, 14, 15, 16 and 17, communicating with the headers on opposite sides of the passage, 5, five banks being shown, although any desired number of banks may be employed. These banks of tubes effect communication between the headers on opposite sides of the firing chamber and form therewith the passages for the other fluid, as the fluid to be heated, in this instance air, which is preferably introduced by means of a pipe, or passage, 18, into the header, 7. These headers and tubes are so arranged that the fluid passing therethrough will be conducted successively through the headers, 8, 9, 10, 11 and 12, and discharged from the latter through a suitable pipe, or passage, 19, traversing all of the tubes of each bank. As the air or other fluid to be heated will increase in volume in passing through the recuperator the capacity of the communicating banks of tubes is increased substantially in proportion to the increase in volume effected by the heat of the heating fluid, or gases, passing through the passage, 5, and this preferably accomplished as clearly indicated in Fig. 2, by increasing the number of tubes in the different banks longitudinally of the recuperator, the bank, 13, containing the greatest number of tubes and being subjected to the highest heat of the heating fluid at the entrance end of the passage, 5. I prefer to employ tubes of silicon carbide, or metal, or other suitable heat conducting material, which can be conveniently set fluid tight in the header walls, 4, 4, so as to prevent the escape of the heated fluid into the heating fluid, or vice versa. By increasing the number of tubes of equal length and area in the banks, the capacity of the passages for the heated fluid are gradually increased, while the cross-sectional area of the tubes remains uniform and facilitates the uniform transfer of heat from the heating fluid to the heated fluid.

The side walls and header walls of the recuperator decrease in vertical height from the end of the recuperator at which the heating fluid enters toward the end from which they are discharged, as shown in Fig. 2, and the passage, 5, and headers, 7-12 inclusive, are closed at their upper ends by a flat arch, or roof, as illustrated in Fig. 3, comprising sections, 20, 21 and 22, of fire brick, over which is preferably placed a layer of heat insulating material, 23. I prefer to form the flat arch in three transverse sections, as shown, the central section, 20, covering the passage, 5, for the heating fluid, and resting upon the header walls, 4, 4, the headers being covered by the separate lateral portions, 21 and 22, of the arch, which preferably rest upon the header walls and the adjacent lateral walls, 1, 1, of the recuperator. The insulating material, 23, assists in sealing the arch, while the transversely divided construction of the arch allows for slight variations in vertical expansion of the header walls and lateral walls without subjecting the roof or arch to injurious strain, which might be the case if the arch sections extended entirely across the recuperator from one exterior wall to the other and in contact with the header walls, which especially at the entrance end are subjected to very high temperatures from the heating fluid. This construction also prevents any leakage of the heating fluid into the heated fluid, or vice versa, as in case any leakage occurs, it will ordinarily be to or from the passages of one or other of said fluids and the atmosphere.

It is a well known fact that for efficient heat transfer from a fluid to a solid, the velocity of the fluid past the surface of the solid must be sufficient to prevent the formation of a stagnant film of fluid on the surface of the solid. This is particularly true in regard to gases, which are poor conductors of heat. Thus in a recuperator of the tube type, it is desirable for efficient operation that the velocity of the heating fluid and also the heated fluid be high enough to prevent the formation of a stagnant film of fluid on the exterior or the interior of the tubes, but not high enough to cause an excessive drop in pressure, which would necessitate additional power to move the fluids through their respective passages.

A definite weight of heating fluid, as flue gas for example, from a furnace at a temperature of 1500° F., would have about twice the volume that the same amount of gas would have when leaving the recuperator after being cooled to a temperature of 500° F. If the cross-sectional area, or capacity, of the spaces through which these gases flow over the heat conducting surfaces, in this instance around the tubes, were constant throughout the length of the recuperator, the hot gases as they enter the recuperator would sweep past the first conducting surface, or tubes which they encounter at too high a velocity and would not be in contact with the heat conducting surfaces or tubes long enough to enable them to give up their heat thereto and to the fluid to be heated within the same, and the power required to move the gases will be very high. At the discharge end of the recuperator where the heating gases leave, their velocity will be so low, by reason of the decrease in volume by cooling, that a stagnant film of gas will form on the exterior of the heat conducting surfaces, or tubes, and the rate of heat transferred will be correspondingly lowered. A corresponding effect will also be produced on the heated fluid, thus reducing materially the efficiency of the recuperator, as the heated fluid is constantly increasing in temperature and volume. In other words, in the ordinary recuperator construction in which the passages for the heating fluid and the fluid to be heated are of substantially uniform capacity throughout, the velocities are too low at one end and too high at the other, and the power required to pass the fluid through their respective passages within the recuperator is unnecessarily great. In accordance with my invention as hereinbefore described, the passages for the heating fluid gradually decrease in capacity in substantial proportion with the decrease in volume due to cooling, while the passages for the heated fluid increase in capacity in substantial proportion with the increase in volume, so that a substantially uniform velocity of both the heating and the heated fluids may be continuously maintained with a substantially uniform heat transfer throughout the recuperator, with a minimum amount of power required for effecting the movement of the fluids through their respective passages.

My recuperator is also extremely compact, simple and inexpensive to construct, and the air available for heat transfer is used with maximum efficiency. The recuperator can be built on a flat slab foundation, indicated at 24 for example, without complicated underground foundation structures, arches or flues. It is not essential that the sectional flat arch, or roof or the recuperator should be enclosed with insulating material, 23, and this may be omitted, and the sections, 20, 21 and 22, laid in the form of slabs without mortar, permitting them to be removed when desired for cleaning out, as there is practically no opportunity for leakage of one fluid into the other, or vice versa, in my construction. The air, or fluid, to be heated passing through the recuperator is usually under a pressure higher than that of the atmosphere, while the heating fluid, or flue gas, is usually under suction, that is, at a pressure lower than atmospheric, therefore, any leakage which is likely to occur at the roof, or arch, will be between the atmosphere and the heating fluid, or between the atmosphere and the fluid to be heated, and not between the heating fluid and the fluid to be heated, or vice versa.

I have shown as my preferred construction in Fig. 1, 2 and 3, an arrangement in which the passages for the heating fluid are decreased in height while their width remains uniform and with the tubes of conducting material arranged in horizontal position, but this is not essential. The passage for the heating gases can be placed vertically, with cross-sectional area increasing either upwardly or downwardly, and the tubes may be placed horizontally. The tubes can also be placed vertically with the passages for heating gases horizontal. I prefer the horizontal arrangement of tubes, however, as it eliminates underground flues, which would be practically necessitated if the tubes were placed vertical. It will also be understood that the heating fluid may be passed through the tubes, and the air, or other fluid, to be heated may be passed through the passage, 5, in the reverse direction to that shown in the arrows in Figs. 1, 2 and 3, if desired, but I prefer the arrangement shown in which a horizontal flow of both air and gases is obtained, and the air to be heated passes through the tubes. It is also to be understood that while the recuperator shown and described is preferably used by passing the heating fluid through the passage, 5, and the fluid to be heated through the headers and tubes in the respective directions indicated by the arrows, the fluid to be heated may be passed through the passage, 5 in the opposite direction to that indicated by the arrows, and the heating fluid may be passed through the headers and tubes also in the opposite direction to that indicated by the arrows, if desired.

In Fig. 4 I have shown a slight modification of my invention, in which similar parts are indicated by the same reference numerals, with the addition of 100 to avoid repetition, and these parts need not be again described.

In this modification, I have shown a construction in which the increased capacity of the banks of tubes is obtained by increasing the diameter of the tubes themselves in the different banks without increasing materially their number, thus the tubes of the several banks, 117, 116, 115, 114 and 113, are increased in diameter in a direction toward the entering end of the passage, 5, for the heating fluid. The operation of this form of recuperator will be precisely the same as that previously described, and need not be repeated.

It will be understood that in the operation of the recuperator, the passage, 5, will ordinarily be connected with a conduit, or passage, indicated at 25, leading from a furnace or furnaces, or other sources of waste, or other highly heated gaseous products, and after said products have passed through the recuperator they are conducted away by a suitable pipe, or conduit, 26. On account of the undesirability of subjecting a fan, or other forcing means, to the said products when very highly heated, it is preferable to provide the power for moving the heating fluid through the recuperator by suction, and this may be conveniently accomplished by connecting the conduit, 26, with a suitable source of suction, as a suction fan, or a stack. It is customary to move the fluid to be heated through the recuperator by means of a forcing device, as a fan, or blower, which may be connected with inlet pipe, 18, as the fluid to be heated leaves the recuperator at such high temperature that it would be inadvisable to pass it through a suction fan. Where the temperatures permit, however, a suction fan could be connected with outlet pipe, 19, for the fluid to be heated, and the heating fluid could be withdrawn from its source by any suitable means and forced through the conduit, 25, through the recuperator, within the scope of my invention.

Where it is desired to construct recuperators of very large capacity and to avoid the use of tubes of heat conducting material, of excessive length, I may provide a plurality of longitudinal passages in the recuperator decreasing in capacity from one end to the other and each provided with a series of banks of tubes of heat conducting material constructed to increase the capacity of said banks in the opposite direction longitudinally of the recuperator, either by increasing the number of tubes in the successive banks, or by increasing the diameter of the tubes, as hereinbefore described, in conjunction with headers on opposite sides of said passages, communicating with the tubes, so that the heating fluid and the fluid to be heated will be divided either before entering the recuperator or during its passage therethrough. In Fig. 5, I have illustrated a partial plan view of one form of recuperator embodying my invention in which this feature is carried out, the corresponding parts to those illustrated in Figs. 1, 2 and 3 being indicated by the same reference characters with the addition of 200. In this instance I have shown two longitudinal passages, 205 and 205$^a$, separated by centrally located headers, 207, 209 and 211, separated from each other by transverse walls, 206, and communicating with the inner ends of banks of tubes, indicated at 213, 214, 215 and 216, extending across the passage 205, and also communicating with the inner ends of banks of tubes, 213$^a$, 214$^a$, 215$^a$ and 216$^a$, extending across the passage, 205$^a$, the outer ends of each set of banks of tubes communicating with exterior headers, 208, 210, 208$^a$ and 210$^a$, as clearly indicated in Fig. 5, it being understood that in this instance a vertical longitudinal section through each passage, 205 and 205$^a$, will be substantially identical with the cross section illustrated in Fig. 2, that is to say, the height of said passages will decrease in the direction of the arrows, $a$, in Fig. 5, while the banks of tubes will increase in number in the opposite direction. The centrally located headers, 207, 209 and 211, are preferably made of double the capacity of the exterior headers, as shown. In this construction one of the fluids, which may be for example the heating fluid, will be divided and a portion delivered to passage, 205, another portion being delivered to passage, 205$^a$, and passing through said passages in the direction of the arrows, $a$, around the tubes of the several banks and decreasing in temperature in proportion to the decrease in the capacity of the passages, 205 and 205$^a$, the other fluid, for example the fluid to be heated, may be introduced into the header, 207, where it will divide, a portion passing through the banks of tubes and exterior headers on one side of the recuperator, while the other portion passes through the banks of tubes and exterior headers on the other side of the recuperator in the directions indicated by the other arrows in Fig. 5, and passing out from the header, 211. Obviously the heating fluid could be passed through the tubes and the fluid to be heated through the tubes and headers, and the fluid to be heated could be passed through the passages, 205 and 205$^a$, by reversing the direction of movement of both fluids, if this were desirable. It will also be understood that any desired number of longitudinal passages for one fluid containing banks of tubes for the other fluid and constructed and operating as hereinbefore described, could be employed.

In the specification and claims, I have referred to the heating fluid as indicating the highly heated fluid as the waste furnace gases, etc., from which heat is to be recovered, and the fluid to which the heat is to be transmitted from the heating fluid, I have termed the fluid to be heated.

What I claim and desire to secure by Letters Patent is:—

1. A recuperator provided with a passage for the heating fluid therethrough, and provided with passages for a fluid to be heated, through the recuperator, said passages comprising tubular heat conducting members located within said passage, the capacity of the passages for the fluid to be heated increasing between the point of entrance of said fluid and the point of eduction thereof substantially in proportion to the increase in volume of said fluid to be heated by reason of the increase in temperature thereof, whereby the velocity of the fluid to be heated may be maintained throughout the recuperator, and the formation of a stagnant film of said fluid on the interior of the tubular conducting members is prevented.

2. A recuperator provided with a passage for the heating fluid gradually decreasing in capacity substantially in proportion to the decrease in volume of said fluid due to the cooling thereof, and passages for the fluid to be heated including heat conducting tubular members located within said first mentioned passage increasing in capacity between the point of entrance of said fluid to be heated and the point of eduction thereof substantially in proportion to the increase in volume of said fluid to be heated by reason of the increase in temperature thereof, whereby the velocity of both fluids through the recuperator may be maintained substantially constant throughout, and the formation of a stagnant film of fluid on the exterior or interior of the said heat conducting members is prevented.

3. A recuperator provided with separate passages for heating fluid and a fluid to be heated, for conducting said fluids respectively through the recuperator in opposite directions, one of said passages decreasing in capacity and the other increasing in capacity in the opposite direction, the conducting passage for one of said fluids including tubular heat conducting portions located within the passage for the other fluid, whereby the velocity of each fluid may be maintained substantially constant throughout the recuperator, and the formation of a stagnant film of one fluid on the exterior of said tubular portions, and of the other fluid on the interior of said tubular portions is prevented.

4. A recuperator provided with a centrally located passage decreasing in capacity from one end to the other, headers located on opposite sides of said passage, and banks of heat conducting tubes connecting said headers in series and extending transversely of the first mentioned passage.

5. A recuperator provided with a centrally located passage decreasing in capacity from one end to the other, headers located on opposite sides of said passage, and banks of heat conducting tubes connecting said headers in series and extending transversely of the first mentioned passage, said banks of tubular connections increasing in capacity longitudinally of said central passage in the same direction as the increase in capacity of said passage, said central passage and the passages formed by said headers and tubular connections being provided respectively with means for passing a heating fluid and a fluid to be heated therethrough in opposite directions.

6. A recuperator provided with a centrally located passage having induction and eduction connections, headers located upon opposite sides of said central passage, banks of heat conducting tubular connections extending between said headers, and having portions of conducting material within said central passage and connecting said headers in series, induction and eduction connections for the passages formed by said headers and tubular connections, the capacity of said tubular heat conducting connections being increased gradually between the induction and eduction connections substantially in proportion with the increase in volume of the fluid passing therethrough, whereby the velocity of said fluid may be maintained substantially uniform throughout the recuperator, and the formation of a stagnant film of fluid within said tubular heat conducting connections is prevented.

7. A recuperator provided with a centrally located passage having induction and eduction connections, headers located upon opposite sides of said central passage, a plurality of series of tubular connections, of heat conducting material connecting said headers in series, and extending across said first mentioned passage at different points longitudinally thereof, induction and eduction connections for the passages formed by said headers and tubular connections, the number of tubular connections in the several series increasing in a direction longitudinally of said central passage substantially in proportion to the increase in volume of the fluid passing therethrough.

8. A recuperator provided with a centrally located passage having induction and eduction connections, headers located upon opposite sides of said central passage, a plurality of series of tubular connections, of heat conducting material connecting said headers in series, and extending across said first mentioned passage at different points longitudinally thereof, induction and eduction connections for the passages formed by said headers and tubular connections, the number of tubular connections in the several series increasing in a direction longitudinally of said central passage substantially in proportion to the increase in volume of the fluid passing therethrough, said central passage decreasing in capacity longitudinally thereof in a direction opposite to the increase of capacity of said series of tubular connections.

9. A recuperator provided with a supporting base, side and end walls, parallel header walls extending longitudinally of the recuperator and spaced from the exterior walls, transverse partitions extending from each header wall to the adjacent exterior wall to provide a central longitudinal passage and a plurality of headers on each side thereof, the partition walls on one side of said central passage being staggered with respect to those on the opposite side, a series of tubular connections of heat conducting material extending from each header to a header on the opposite side of said central passage and connecting said headers in series, said connections having portions extending across said central passage, and an arch construction covering said headers and said central passage, and sealing the same.

10. A recuperator provided with a supporting base, side and end walls, parallel header walls extending longitudinally of the recuperator and spaced from the exterior walls, transverse partitions extending from each header wall to the adjacent exterior wall to provide a central longitudinal passage and a plurality of headers on each side thereof, the partition walls on one side of said central passage being staggered with respect to those on the opposite side, a series of tubular connections of heat conducting material extending from each header to a header on the opposite side of said central passage and connecting said headers in series, said connections having portions extending across said central passage, an arch construction having portions covering said central passage and supported by the header walls, and separate portions covering said headers and supported by the header walls and adjacent exterior walls.

11. A recuperator provided with a supporting base, side and end walls, parallel header walls extending longitudinally of the recuperator and spaced from the exterior walls, transverse partitions extending from each header wall to the adjacent exterior wall to provide a central longitudinal passage and a plurality of headers on each side thereof, the partition walls on one side of said central passage being staggered with respect to those on the opposite side, a series of tubular connections of heat conducting material extending from each header to a header on the opposite side of said central passage and connecting said headers in series, said connections having portions extending across said central passage, an arch construction having portions covering said central passage and supported by the header walls, and separate portions covering said headers and supported by the header walls and adjacent exterior walls, said central passage decreasing in height from one end of the recuperator to the other to vary the capacity thereof substantially in proportion to the change in volume of the fluid passing therethrough, and the said tubular connections between the headers on the opposite sides of said passage increasing in capacity in the opposite direction, longitudinally of the recuperator substantially in proportion to the change in volume of the liquid passing therethrough.

In testimony hereof I affix my signature.

DWIGHT B. HENDRYX.